May 14, 1968 R. W. SANDERS 3,383,598
TRANSMITTER FOR MULTIPLEXED PHASE MODULATED SIGNALING SYSTEM
Filed Feb. 15, 1965 2 Sheets-Sheet 1

RAY W. SANDERS
INVENTOR.

BY John E. Wagner
ATTORNEY

TRANSMITTER FOR MULTIPLEXED PHASE MODULATED SIGNALING SYSTEM

Filed Feb. 15, 1965 2 Sheets-Sheet 2

RAY W. SANDERS
INVENTOR.
BY John E. Wagner
ATTORNEY

United States Patent Office 3,383,598

Patented May 14, 1968

3,383,598

TRANSMITTER FOR MULTIPLEXED PHASE MODULATED SIGNALING SYSTEM

Ray W. Sanders, Los Angeles, Calif., assignor to Space-General Corporation, El Monte, Calif., a corporation of California Continuation-in-part of application Ser. No. 133,447, Aug. 23, 1961. This application Feb. 15, 1965, Ser. No. 432,762

8 Claims. (Cl. 325—163)

ABSTRACT OF THE DISCLOSURE

This disclosure relates to a multiplex phase modulation information transmission system suitable for transmitting four channels of binary data on a single carrier. The disclosure includes the unique transmitter which develops composite waveforms from a pair of binary input channels and uses this composite wave to phase modulate a carrier Through the use of a pair of gain control circuits, one fixed and one variable, the signal detectability of either of the two channels may be selectively enhanced as in the case where one channel has higher data rate than the other or is of greater significance.

The present invention relates in general to the communications art and more particularly relates to a multiplexed system of signaling employing phase modulation, the transmitted information being uniquely reproduced by means of phase-locked circuits.

This is a continuation-in-part of the U.S. Patent application of Ray W. Sanders Ser. No. 133,447, filed Aug. 23, 1961, now U.S. Patent No. 3,218,557.

Important information is oftentimes received or obtained from the transmission of pulse trains. The present invention concerns itself with the multiplexing of such pulse trains, that is, with the simultaneous transmission of a pair of pulse trains on the same carrier wave. In essence, a pair of pulse trains having different pulse repetition rates are combined to form a single wave which varies between four different voltage levels. This last wave is then used to phase modulate a carrier, the phase shifts corresponding to the different voltage levels. At the receiver site, the modulated carrier is processed to reproduce the original pulse trains, phase-lock circuit theory being uniquely used in the demodulate process.

Accordingly, one object of the present invention is to provide a system of signaling involving the multiplexing process in connection with the transmission of pulse trains.

Another object of this invention is to maximize detectability and reliability in multiplex transmission systems consistent with minimum transmission power requirements.

Another object of the present invention is to provide a signaling system in which phase-lock loop theory is significantly employed in the demodulation process.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
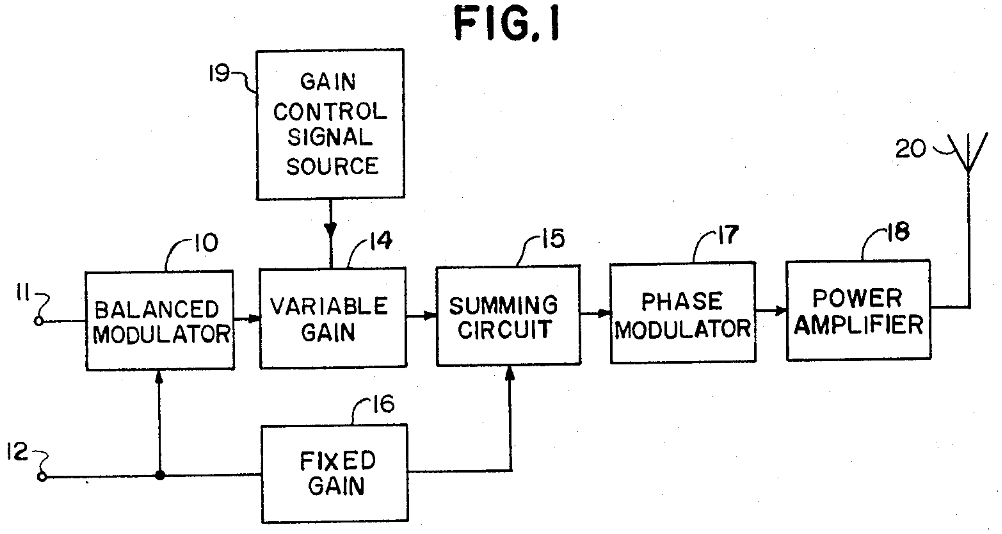
FIG. 1 is a block diagram illustrating the transmitter portion of a signaling system according to the present invention.
Figure 2:
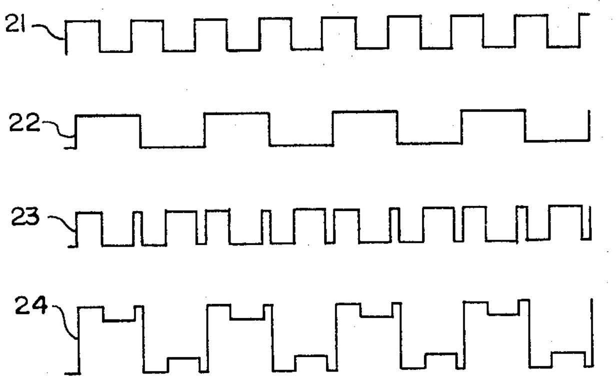
FIG. 2 is a flow chart illustrating the voltage waveforms existing at various points in the transmitter of FIG. 1.

Referring now to the drawings and in particular to FIGS. 1 and 2 therein, the transmitter is shown to include a balanced modulator 10 whose two inputs are connected to receive a pair of pulse trains at input terminals 11 and 12. The balanced modulator output is connected through a variable gain device 14 to the first of two inputs to a summing circuit 15, the second input to the summing circuit being coupled through a fixed gain device 16 to input terminal 12. The summing circuit output is then fed to a phase modulator 17 in preparation for transmission, a power amplifier 18 being coupled between the phase modulator and an antenna 20.

In operation, two pulse trains having different pulse repetition rates are respectively applied to input terminals 11 and 12 and, therefore, to the two inputs to balanced modulator 10, the pulses in these trains preferably varying between "0" and "1" levels. Examples of the types of pulse trains that may be applied to the balanced modulator are shown as waveforms 21 and 22 in FIG. 2. As a result, the signal produced by the modulator is illustrated by waveform 23 in FIG. 2 and consists of a pulse train whose pulses also vary between "0" and "1" values but whose pulse durations are unequal.

More specifically, in accordance with the principles governing balanced modulators, signal 23 has a "1" value whenever signals 21 and 22 simultaneously or coincidentally have "1" or "0" values, that is to say, whenever they are simultaneously at the same voltage level. On the other hand, signal 23 has a "0" value whenever signals 21 and 22 are at different voltage levels, that is, whenever one of these two signals has a "1" value and the other of them has a "0" value. The signals represented by waveforms 22 and 23 are applied to summing circuit 15 wherein they are linearly added. However, before being applied to the summing circuit, these signals are respectively passed through fixed and variable gain devices 16 and 14 so that their amplitudes may be adjusted to different values for the purpose of providing four different voltage levels in the signal produced at the output of the summing circuit and applied to phase modulator 17. More particularly, a phase modulator is a device that will shift the phase of a carrier, i.e., phase modulate a carrier, according to the level of the D.C. voltage applied to it. As will be seen later, four different phase shifts are imposed upon a carrier in the embodiment being described, with the result that four different voltage levels must be applied to the phase modulator. To achieve this result, waveform 23 is applied to variable gain device 14 whose gain has been increased to sufficiently amplify signal 23 so that, when signal 23 is added to signal 22 in summing circuit 15, a waveform having the desired four different voltage levels, such as waveform 24, is produced.

The variable gain device may be controlled simply by an manual gain control on an amplifier or may be remotely controlled as by a telemetry control link or automatically through local feedback control. Each of these devices are represented in the drawing as the gain control signal source 19 coupled to the variable gain device 14. The introduction of the selective gain relationship between the output of balanced modulator 10 and the signal on input terminal 12 allows the selective control of relative power level of the two information channels as hereinafter described. An example of the kind of waveform that may be obtained at the output of the summing circuit and that may be applied to the phase modulator is illustrated by waveform 24 in FIG. 2.

In phase modulator 17 a carrier is subjected to any one of four possible phase shifts, the particular phase shift experienced by the carrier at any one time depending upon the voltage level of signal 24 at that time. By way of example, the four phase shift angles may be $$\pm\frac{\pi}{2}\pm\alpha$$

Thus, again by way of example, the carrier out of the phase modulator may at any time be any one of the following, namely:

$$A\sin\left(\omega t+\frac{\pi}{2}+\alpha\right)$$

$$A\sin\left(\omega t+\frac{\pi}{2}-\alpha\right)$$

$$A\sin\left(\omega t-\frac{\pi}{2}+\alpha\right)$$

and $$A\sin\left(\omega t-\frac{\pi}{2}-\alpha\right)$$

Following the step of phase modulation, the carrier signal is power amplified in circuit 18 and thereafter applied to antenna 20 for radiation into space.

Figure 4:
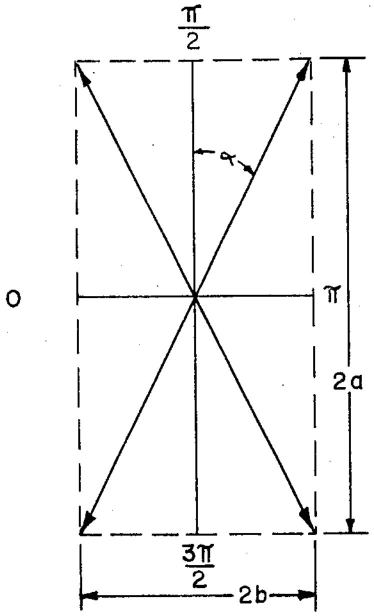
FIG. 4 is a phase diagram of the signal from the transmitter of FIG. 1.

The phase modulated signals applied to the antenna 20 are presented in the phase diagram of FIG. 4 showing four vectors designated 1, 2, 3 and 4 corresponding to the four discrete voltage levels from the summing circuit 15. The fixed gain device 16 is adjusted so that the two discrete voltage levels on terminal 12, as amplified in the fixed gain device 16, produce a $\pi/2$ and $$-\frac{\pi}{2}$$

phase shift, respectively, in the phase modulator 17 output. The gain level of device 14 on the other hand is set to produce discrete voltage levels corresponding to phase shift of $\alpha$ degrees where $\alpha$ preferably falls between 0° and 90°. The value of $\alpha$ is not arbitrarily established but rather is either controlled in advance or during transmission as a function of the relative data rates of the two channels or alternately of the reliability requirements of the two channels denoted by the terminals 11 and 12.

As shown in FIG. 4 $\alpha$ is less than 45° and obtained by setting the gain level of device 14 at less than that of fixed gain device 16. This choice of $\alpha$ is preferred where the data rate of information at terminal 12 exceeds the data rate from the source connected to terminal 12. Where $\alpha$ is less than 45°, the component power radiated from the transmitter antenna 20 carrying the information on terminal 12 is represented by the vertical component ($2a$) of the phase diagram of FIG. 4. The transmitted power of signal 21 at terminal 11 is proportional to the component ($2b$). In terms of phase shift a signal on terminal 11 produces phase shift deviations of $2\alpha$ upon each transition while a signal on terminal 12 produces phase shifts of $\pi-2\alpha$ degrees. Since the angle $\pi-2\alpha$ is greater than $2\alpha$ by definition, the detection probability of the information from terminal 12 is enhanced. In a situation as herein described, this enhanced detection probability is designed to offset the reduced probability of error-free reception at higher data rates. In the case where the data rates are substantially equal and the transmission reliability of one channel is necessarily higher, the high reliability channel signal should be applied to terminal 12 and a gain reducing signal from source 19 be applied to variable gain device 14 to reduce the incremental voltage output to the summing circuit 15 and the value of $\alpha$. Therefore, this invention is particularly suited for multiplex digital transmission systems having different data rates and equal reliability standards or substantially equal data rates and higher reliability requirements on one data source.

Figure 3:
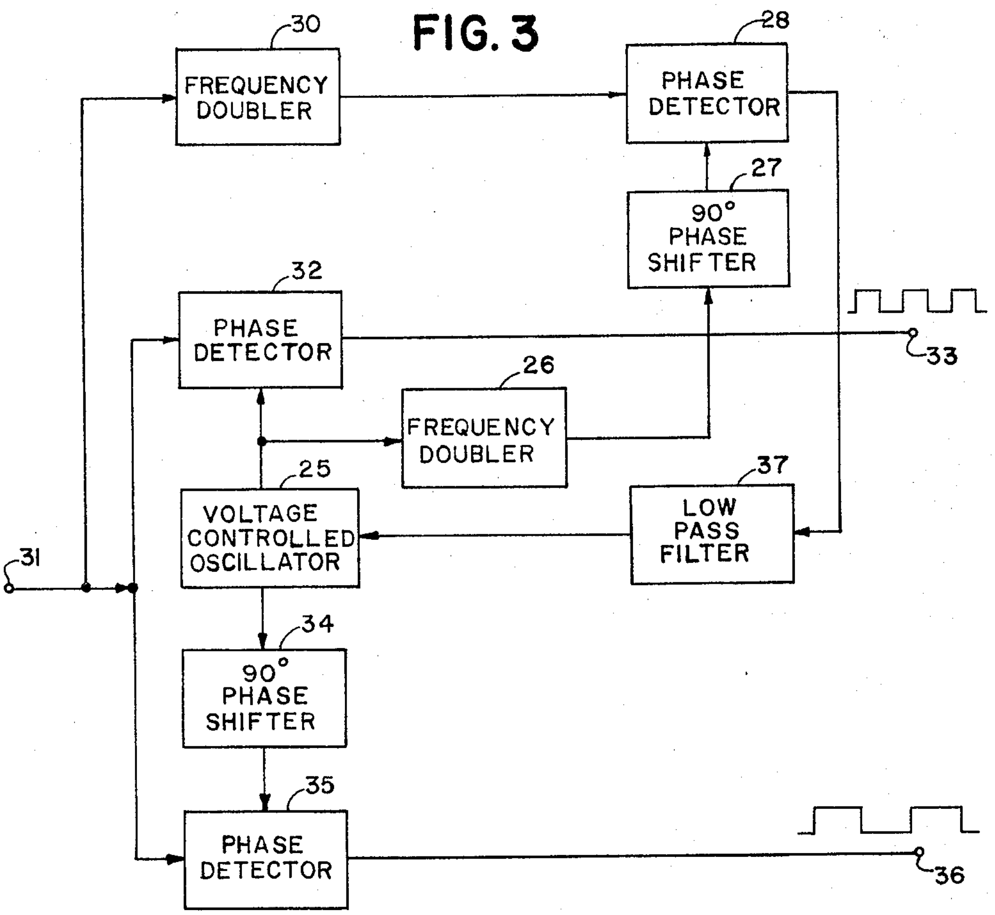
FIG. 3 is a block diagram illustrating the receiver portion of a signaling system according to the present invention.

Reference is now made to the receiver portion of the system in FIG. 3, which is shown to include a voltage controlled oscillator 25 that is connected through a frequency doubler 26 and thereafter through a 90° phase shifter 27 to the first of two inputs to a phase detector 28. A frequency doubler 30 is also connected between the first input to phase detector 28 and the input to the receiver, namely, an input terminal 31. In addition to being connected to frequency doubler 26, voltage controlled oscillator 25 is also connected to the first of two inputs to a phase detector 32 whose other input is connected to input terminal 31, the output of this phase detector being one of the two outputs for the receiver and is designated 33. Again, voltage controlled oscillator 25 is coupled through a 90° phase shifter 34 to still another phase detector circuit 35, this last detector circuit also being connected between input terminal 31 and the second output for the receiver which is designated 36. Finally, a suitable low pass filter 37 is coupled between the output end of phase detector 28 and the input end of oscillator 25.

In considering the operation, it is briefly stated that transmissions are received at input terminal 31 and, after being processed, waveforms 21 and 22 generated at the transmitter site are reproduced at output terminals 33 and 36 respectively. More particularly, upon receipt, the transmitted phase modulated carrier is applied to frequency doubler 30, with the obvious result that the signal applied to phase detector 28 is at twice the frequency of the incoming signal. Furthermore, due to the frequency doubling step, the four phase shift angles are now:

$$+\pi+2\alpha$$
$$+\pi-2\alpha$$
$$-\pi+2\alpha$$

and $$-\pi-2\alpha$$

At the same time, the signal out of voltage controlled oscillator 25, which signal is at the same frequency as the transmitted carrier, is applied to frequency doubler 26 and then to 90° phase shifter 27 wherein, as is implied, the frequency of the oscillator signal is doubled and its phase shifted by 90° before being applied to phase detector 28. Under conditions where the carrier received at input terminal 31 is unmodulated, the carrier and oscillator signals not only have the same frequency but are quickly brought into phase with each other, with the result that the two signals applied to phase detector 28 are at the same frequency but out of phase with each other by an angle of $\pi/2$ degrees.

Since a phase detector circuit produces a maximum output voltage when the signals applied to it are in phase and a zero output when the signals applied to it are $\pi/2$ degrees out of phase, the output from phase detector 28 would be substantially zero under the conditions mentioned. However, where the received carrier is phase modulated as herein, the two signals applied to phase detector 28 have the same frequency but are out of phase with each other by the angles $$\frac{\pi}{2}\pm2\alpha$$

degrees. It will, therefore, be obvious to those skilled in the art that the signal out of phase detector 28 and passed through low pass filter 37 will fluctuate between two limits corresponding to $\pm2\alpha$. It will also be recognized that in response to the signal out of low pass filter 37 that the phase of the voltage controlled oscillator signal will correspondingly be shifted $\pm\alpha$ degrees. In other words, the signal applied to phase detector 32 and to phase shifter 34 is constantly being phase shifted by $\pm\alpha$ degrees. Since the phase modulated carrier is also applied to phase detector 32, the signal out of the detector and finally reproduced at output terminal 33 is that of waveform 21 in FIG. 2, which waveform was instrumental in producing the $\pm\alpha$ phase shifts at the transmitter site.

The transmitted carrier is also applied to phase detector 35 to which is further applied the output from voltage controlled oscillator 25 after that output has been passed through 90° phase shifter 34. Since the oscillator signal has previously experienced $\pm\alpha$ phase shifts, it will be recognized that the two signals applied to phase detector 35 therefore tend to be in phase with each other, with the result that the phase detector output signal reproduced at output terminal 36 is substantially a duplicate of waveform 22 in FIG. 2, which waveform was used to produce the $\pm\pi/2$ phase shifts in the carrier at the transmitter site. It is thus seen that information signals 21 and 22 applied to the transmitter are reproduced by the receiver.

Having thus described the invention, what is claimed as new is:

1. In a signaling system a transmitter for transmitting a particular phase modulated carrier in response to the application thereto of first and second pulse trains, said transmitter comprising:
   - means receptive of the first and second pulse trains and operable in response thereto to produce a third pulse train whose amplitude varies between four different voltage levels;
   - said last means, including a first combiner, for producing a first set of two of the four different voltage levels derived from one of the pulse trains and said last means including a second combiner for producing second set of two voltage levels derived from a composite of the first and second pulse trains;
   - means for adjusting the relative level of the two sets of different voltage levels with respect to each other;
   - means for phase modulating a carrier as a function of the magnitude of the four different voltage levels; and
   - means for radiating the phase modulated carrier wave.

2. In a signaling system, a transmitter for radiating a multiplexed phase modulated carrier comprising:
   - means receptive of first and second pulse trains and operable in response thereto to produce a third pulse train constituting a composite of the first and second pulse trains;
   - means combining the third pulse train with one of said first pulse trains to produce a fourth pulse train having four discrete levels;
   - means for phase modulating a carrier with the fourth pulse train; and
   - means for radiating the phase modulated carrier.

3. The combination in accordance with claim 2 including means for selectively varying the level of the third pulse train with respect to said first pulse train.

4. The transmitter defined in claim 2 wherein said combining means includes a summing circuit for linearly adding signals applied to it, a fixed gain device coupled to apply the second pulse train with a predetermined amplitude to said summing circuit, and a variable gain device coupled between said balanced modulator and said summing circuit for adjusting the amplitude of said third pulse train in such a manner that said fourth pulse train is produced by said summing circuit.

5. A transmitter for transmitting phase modulated multiplexed pulse trains comprising:
   - input terminal means for receiving respective first and second pulse trains;
   - means for combining the first and second pulse trains into a third pulse train having two discrete levels, one indicative of coincidence of the first and second wave trains and the second indicative of lack of coincidence thereof;
   - means for independently controlling the gain of the third pulse train with respect to the first pulse train;
   - means for combining the first and third pulse trains to produce a fourth pulse train having a plurality of levels representing the combined pulse trains;
   - means for phase modulating a carrier with the fourth pulse train; and
   - means for radiating the phase modulated carrier.

6. A transmitter in accordance with claim 5 wherein said first and second pulse train combining means comprises a balanced modulator.

7. A transmitter in accordance with claim 5 wherein said first and third pulse train combining means comprises a summing circuit.

8. In a signaling system a transmitter for transmitting a particular phase modulated carrier in response to the application thereto of first and second pulse trains, said transmitter comprising:
   - a balanced modulator receptive of the pulse trains and operable in response thereto to produce a third pulse train whose pulses occur whenever the pulses of the first and second pulse train coincide in time;
   - means for adding the second and third pulse trains to produce a fourth pulse train, said means including circuits for adjusting the amplitudes of said second and third pulse trains in such a manner that said fourth pulse train varies between four different voltage levels; and
   - output apparatus for radiating a phase modulated carrier signal, said apparatus being coupled to receive said fourth pulse train and operable in response thereto to produce carrier phase shifts of $$\pm\frac{\pi}{2}\pm\alpha$$

degrees respectively corresponding to the four different voltage levels of said fourth pulse train, where $\alpha$ is an angle between zero and 90°.

References Cited

UNITED STATES PATENTS

| | | | |
|---|---|---|---|
| 2,905,812 | 9/1959 | Doelz et al. | 325—39 X |
| 3,048,658 | 8/1962 | Buff | 178—66 X |

ROBERT L. GRIFFIN, *Primary Examiner.*

JOHN W. CALDWELL, *Examiner.*

W. S. FROMMER, *Assistant Examiner.*